(No Model.)
J. B. HOLTON.
GATE.
No. 357,529. Patented Feb. 8, 1887.
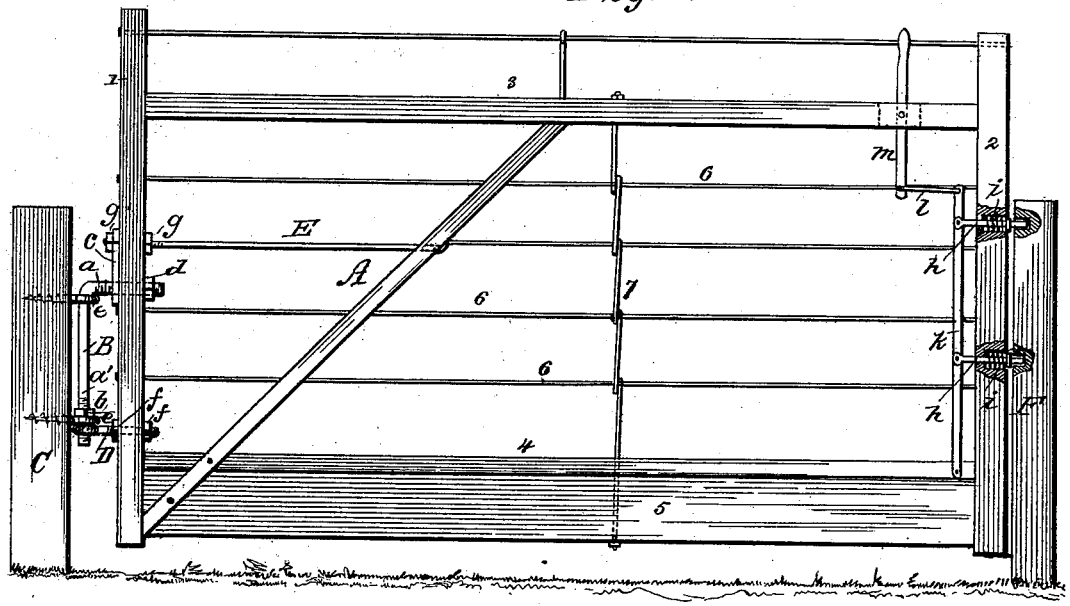
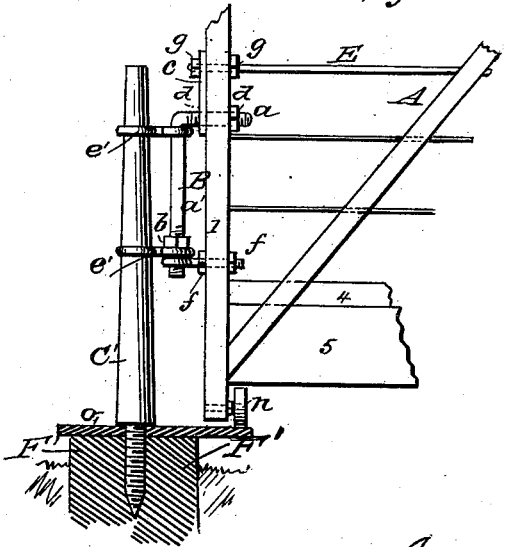
WITNESSES:
Fred G. Dieterich
Amos F. Hart
INVENTOR:
John B. Holton
BY Munn & Co.
ATTORNEYS.

UNITED STATES PATENT OFFICE.

JOHN BACON HOLTON, OF WASHINGTON, KENTUCKY.

GATE.

SPECIFICATION forming part of Letters Patent No. 357,529, dated February 8, 1887.

Application filed November 27, 1886. Serial No. 220,059. (No model.)

*To all whom it may concern:*

Be it known that I, JOHN BACON HOLTON, a citizen of the United States, residing at Washington, in the county of Mason and State of Kentucky, have invented a new and useful Improvement in Gates, of which the following is a full, clear, and exact description, reference being had to the accompanying drawings, forming a part of this specification.

My invention pertains to farm-gates; and it consists in the construction and combination of parts by which the gate is braced, adjusted for taking up sag, and attached to the pivot-post, as hereinafter described and claimed.

In the accompanying drawings, Figure 1 is a side view of the gate proper and its attachments. Fig. 2 is a side view, partly in section, of a modification.

The frame of the gate is composed of the two uprights or end bars, 1 2, the horizontal bars 3 4, (which are tenoned into the uprights,) the base-board 5, secured to uprights 1 and 2 and bar 4, and the diagonal brace A, which extends from the rear lower corner of the gate (being shouldered into bar 4 where it crosses the same) to a point near the middle of the upper bar, 3.

In connection with bars 1 2 3 4 and base-board 5, I employ wires or rods 6 with heads and nuts, which rods are arranged parallel to the base-board and pass through the uprights 1 2 and brace A, as shown. Near the middle of the gate these wires or rods 6 are connected by a vertical tie rod or wire, 7, bolted through bars 3 and 4 and base-board 5.

The main element or feature of my improvement is the right-angular hinge-rod B. Its shorter and horizontal arm $a$ is screw-threaded, and its longer arm also, to the point indicated by the nut $b$, which is screwed thereon. The shorter arm, $a$, of said hinge-rod B is screwed through the lower end of plate $c$, which is fastened in position against the outer face of upright 1, and a nut, $d$, is screwed on the end which projects through a hole in said upright, as clearly shown.

The body or longer arm, $a'$, of rod B is passed down through the eyes of screws $e\ e$, that are set in vertical alignment in the pivot-post C. These screws constitute the bearings of the hinge-rod B, since the nut $b$ rests on the eye of the lower screw, and the horizontal or shorter arm of said rod rests on the eye of the upper screw.

A screw-threaded eyebolt, D, passes through the gate-upright 1, and nuts $f\!f$ are applied to it on the respective sides of said upright. The lower end of the hinge-rod B enters the eye of this bolt D.

It will be seen that by adjustment of the nuts $d\ f$ and screw-plate $c$ the free end of the gate proper may be adjusted higher or lower, as required to attain or maintain a horizontal position.

In addition to the parts already described, I employ a brace-rod, E, which passes horizontally through the upright 1 and screw-plate $c$, just above the hinge-rod B, and also through the diagonal brace A. Nuts $g\ g$ are applied to its threaded rear end to provide for adjustment, for the purpose of taking up any sag of the gate. In this operation the rod E coacts with the diagonal brace A and screw-plate $c$ on right-angular rod B, as well as with the gate-upright 1, besides strengthening and stiffening the gate as a whole, and the hinge-rod B, screw-eyebolt D, and the nuts $d\ f$ and plate $c$ also co-operate with brace-rod E and brace A in respect to adjustment.

The latch proper is formed of two sliding rods or catches, $h\ h$, having spiral springs $i\ i$ applied to them for the purpose of holding them engaged with the latch-post F. The rear ends of the catches $h\ h$ are pivoted to a vertical bar, $k$, and this is in turn connected by a link, $l$, with a lever, $m$, that is pivoted vertically in a slot in the horizontal bar 3. By pressing forward the upper end of the lever $m$ the catches $h\ h$ will be drawn back so as to release the gate.

As shown in Fig. 2, the gate has a friction-roller, $n$, attached at its lower rear corner, and this rolls on a base-plate, $o$, that is screwed on the post C', which is in turn fastened into block F, set in the ground. In the same figure I also illustrate a substitute for the screws shown in Fig. 1, the same being double eye-bolts $e'\ e'$, that slip over the tapered post C', and also receive the angular hinge-rod B.

What I claim is—

1. The swinging hinge-rod B, having the form of a right angle and screw-threaded at each end, in combination with the gate proper, the nuts $f$ $d$, the pivot-post C, and the eyebolts $e$ $e$, the bolt D, attached to the gate, and nuts $f$, applied to the bolt, as shown and described, whereby said hinge-rod is supported and turns freely in the pivots and in turn supports the gate, which is adapted for adjustment in the manner specified.

2. The combination of the right-angular swinging hinge-rod B, screw-threaded, as shown, the nuts $b$ $d$, gate-bolt D, and nuts $f$, with the gate proper, and its diagonal brace A and adjusting brace-rod E, and the pivot-post C and eyebolts $e$ $e$, all as shown and described.

JOHN BACON HOLTON.

Witnesses:
 DANIEL PERRINE.
 J. R. BURGESS.